United States Patent [19]

Jenkins et al.

[11] 3,966,636

[45] June 29, 1976

[54] SEQUENTIAL HYDROGENATION-OXIDATION-HYDROGENATION OF RHODIUM AND RUTHENIUM CATALYSTS

[75] Inventors: John W. Jenkins, Seabrook; Ronald S. Bauer; Harold E. De La Mare, both of Houston, all of Tex.

[73] Assignee: Shell Oil Company, Houston, Tex.

[22] Filed: Dec. 19, 1974

[21] Appl. No.: 534,547

[52] U.S. Cl. .............................. 252/419; 252/416; 260/2 EP; 260/47 EP; 260/348 R
[51] Int. Cl.² ................. B01J 23/96; C07D 301/00
[58] Field of Search .................. 252/419, 416, 411; 260/348 R

[56] References Cited
UNITED STATES PATENTS

| | | | |
|---|---|---|---|
| 3,011,967 | 12/1961 | Schmitkons et al. | 208/140 |
| 3,117,076 | 1/1964 | Brennan et al. | 208/140 |
| 3,150,192 | 9/1964 | Rylander et al. | 252/416 |
| 3,336,241 | 8/1967 | Shokal et al. | 260/2 EP |
| 3,400,073 | 9/1968 | Schwarzenbek et al. | 208/140 |
| 3,673,109 | 6/1972 | Georgescu et al. | 252/419 |
| 3,790,532 | 2/1974 | Fukutani et al. | 260/78.4 EP |

*Primary Examiner*—Patrick P. Garvin
*Assistant Examiner*—P. E. Konopka

[57] ABSTRACT

A process for the regeneration of a catalyst containing a metal of the group consisting of rhodium and ruthenium employed in the hydrogenation of an organic compound possessing at least one carbon-to-carbon bond unsaturation in the presence of a methylene dichloride solvent is taught whereby the catalyst is regenerated after deactivation by contacting the deactivated catalyst first with a hydrogen-containing gas then with an oxygen-containing gas and finally with a hydrogen-containing gas.

4 Claims, No Drawings

SEQUENTIAL HYDROGENATION-OXIDATION-HYDROGENATION OF RHODIUM AND RUTHENIUM CATALYSTS

BACKGROUND OF THE INVENTION

This invention relates to a catalyst regeneration procedure. More particularly, this invention relates to a catalyst regeneration procedure wherein the catalyst is a hydrogenation catalyst. Specifically, the invention provides for a catalyst regeneration procedure, use of which provides an increased catalyst life and an improved reaction rate in the hydrogenation of organic compounds possessing at least one carbon-to-carbon bond unsaturation in the presence of a rhodium or ruthenium catalyst and a methylene dichloride solvent.

The Prior Art

The six metals in the platinum metals group — ruthenium, rhodium, palladium, osmium, iridium, and platinum — are all hydrogenation catalysts. Palladium and platinum catalysts have been widely used as hydrogenation catalysts for decades. Rhodium and ruthenium catalysts also make excellent hydrogenation catalysts, but their development and usage are not as yet so widely appreciated. Iridium and osmium catalysts, on the other hand, are used as catalysts the least of any of the six platinum metals.

One specific usage of rhodium or ruthenium catalysts is in the hydrogenation of unsaturated epoxy compounds as taught in Shokal, U.S. Pat. No. 3,336,241. In Shokal, aliphatic or cycloaliphatic epoxy ethers are prepared by treating compounds possessing carbon-to-carbon unsaturation and at least one vic-epoxy group with hydrogen in the presence of a finely-divided catalyst containing a metal of an atomic number from 44 to 45 inclusive, i.e., a metal of the group consisting of rhodium and ruthenium, preferably supported on an inert carrier such as charcoal or alpha-alumina at a temperature below about 150°C. In the hydrogenation step, the unsaturation linkages are selectively hydrogenated, leaving the epoxy groups substantially intact.

Rhodium or ruthenium catalysts are relatively expensive, and accordingly, it is essential to be able to hydrogenate a large quantity of organic compounds per unit of catalyst. Product yields with the typical Shokal process catalyst, for instance, appear to be limited to less than about 15,000 grams of resin per gram of rhodium or ruthenium metal. As with most catalyst systems, rhodium and ruthenium catalysts gradually lose activity and eventually it becomes necessary to either regenerate the catalyst or else reclaim the metal portion of the catalyst. Reclamation of the rhodium or ruthenium metal from the catalyst is expensive and is not an economically viable alternative. Therefore, it is necessary to employ some type of regeneration procedure.

The typical regeneration procedure for a catalyst containing a metal of the platinum metals group involves an oxidation followed by a reduction of the metal. See Rylander, Catalytic Hydrogenation over Platinum Metals, pp 13–15 (1967). Catalytic regeneration through oxidation involves the conversion of strongly adsorbed inactivating materials to compounds more easily removed, as with the oxidation of divalent sulfur, or the actual burning off of carbonaceous deposits found on the catalyst surface. Once the oxidation step of the regeneration procedure has been completed, it is then necessary to reduce the metal oxides thus formed during the oxidation step. This reduction is accomplished by contacting the oxidized catalyst with hydrogen at an elevated temperature. While the above regeneration procedure has been used successively for the regeneration of platinum metal catalysts, including rhodium and ruthenium catalysts, such a procedure cannot be used for the rhodium or ruthenium catalysts employed with methylene dichloride as the hydrogenation solvent. When conventional regeneration techniques are employed, i.e., when the spent catalyst is dried in nitrogen, then oxidized, and then reduced in hydrogen, the catalyst obtained is totally inactive. Without wishing to be bound by any particular theory, it is considered likely that the reason for this inactivity is the destruction of the catalyst active sites by chlorine gas and oxychlorine compounds formed during the oxidation step. It is believed that the chlorine gas and oxychlorine compounds are produced during the oxidation step of the regeneration due to the presence of chlorine compounds on the catalyst surface from the partial breakdown of the methylene dichloride solvent during the hydrogenation reaction.

A catalyst regeneration procedure has now been found that not only increases the life of the catalyst, but also increases the reaction rate associated with the catalyst.

SUMMARY OF THE INVENTION

The invention relates to a catalyst regeneration procedure for catalysts useful in the hydrogenation of organic compounds possessing at least one carbon-to-carbon bond unsaturation in the presence of a methylene dichloride solvent and a finely divided catalyst containing a metal of the group consisting of rhodium and ruthenium whereby the deactivated catalyst is contacted first with a hydrogen-containing gas then with an oxygen-containing gas and finally with a hydrogen-containing gas.

DETAILED DESCRIPTION OF THE INVENTION

The present invention relates to the hydrogenation of organic compounds containing carbon-to-carbon bond unsaturation. The term "carbon-to-carbon bond unsaturation" includes both normal ethenic and ethynic linkage, as found in olefins and acetylenes, respectively, and the typical aromatic unsaturation. Specific examples of such organic compounds include those compounds listed in Shokal, U.S. Pat. No. 3,336,241, column 2, line 71 to column 5, line 70, which disclosure is herein incorporated by reference.

The rhodium or ruthenium metal catalysts are of two general types supported and unsupported. In the Shokal process, the rhodium or ruthenium metal is preferably supported by an inert carrier to increase its surface area. By inert carrier is meant one that is non-reactive with epoxide compounds with or without the catalyst. Metal oxides of alumina, zirconium, titanium, calcium, silicon, magnesium, tin, molybdenum, and iron are useful. Carbides as silicon carbide and boron carbide are also useful as carriers. When the catalyst is supported by a carrier, the metal content of the catalyst is usually between about 0.1% and about 10.0% weight, preferably about 0.5% and about 5.0% weight metal.

The amount of catalyst which is employed in the hydrogenation reaction varies considerably. In general, the weight ratio of the catalyst metal to the organic compound varies from about 1:50,000 to about 1:100, preferably about 1:15,000 to about 1:1000. The temperature employed during the hydrogenation reaction also varies considerably. Usually, but not always, as the temperature of the hydrogenation is increased, the rate is increased, and accordingly, more efficient use is made of the catalyst and equipment. However, preferred temperatures are generally below 100°C, preferably ambient temperature to about 80°C. The hydrogen pressure preferably employed varies from about 10 psig to about 1,500 psig, although higher pressures such as those up to or over 2,000 psig are also employed. Particularly preferred pressures vary from about 50 psig to about 1,500 psig.

A solvent is used advantageously in most liquid phase hydrogenations; solids, of course, cannot be hydrogenated otherwise, unless melted. Use of a solvent is generally preferred since liquid substrates are normally reduced more easily, and the handling of small quantities of substrates is facilitated. In addition, during large reductions, the solvent is useful for controlling the temperature rise resulting from highly exothermic reactions. Most liquid materials that are stable under hydrogenation conditions and do not inactivate the catalyst can be used as solvents. Mineral and carboxylic acids, esters, ethers, amines, amides, anhydrides, sulfoxides, sulfones, hydrocarbons, and water have all been used as solvents in hydrogenation reactions. In the Shokal process, acceptable solvents include dioxane and ethyl ether. An especially preferred solvent in the Shokal process is methylene dichloride, use of which is disclosed in a copending application by Buls and Chung entitled Hydrogenation Solvent, Ser. No. 529,435, filed Dec. 4, 1974, now abandoned. The amount of solvent employed in the hydrogenation varies from about 5% to about 90% of the reaction mixture, preferably from about 50% to about 90%.

As stated above, the typical catalyst regeneration procedure for a catalyst containing a metal of the platinum metals group cannot be employed to regenerate a rhodium or ruthenium employed in a hydrogenation reaction when methylene dichloride has been used as the hydrogenation solvent. In order to prevent the destruction of the catalyst during regeneration, which is believed to occur because of the formation of chlorine gas and oxychlorine compounds, a different regeneration procedure has been proposed. This regeneration procedure requires three steps as compared to the conventional two step procedure.

The first step of the present regeneration procedure involves contacting the spent catalyst with a hydrogen-containing gas at between about 400°C and about 600°C for between about one-half hour and about 2 hours, preferably between about two-thirds hours and about 1½ hours. This first step hydrogen stripping is thought to remove any chlorine compounds as hydrogen chloride. It has been found that the hydrogen chloride produced during this step does not destroy the active sites of the catalyst.

Whereas pure hydrogen can be used as the stripping gas in the first step, it is often found that exothermic hydrogenolysis reactions occur which can overheat and damage the catalyst. These effects can be better controlled if the hydrogen content of the stripping gas is from about 1% to about 15% with the remainder of the gas being inert. It should be noted that all gas concentrations herein are expressed as percent volume. A preferred hydrogen-containing gas consists of about 6% hydrogen with the remainder an inert gas such as nitrogen. It is preferred that the temperature of the catalyst during the hydrogen stripping step be increased gradually from ambient to between about 400°C and about 600°C, preferably between about 450°C and about 550°C, and then held at the maximum temperature desired for between about two-thirds hour and about 1½ hours.

The second step of the present regeneration procedure is a reoxidation of the metal on the catalyst by contacting the hydrogen-stripped catalyst with an oxygen-containing gas at elevated temperatures. The oxygen content of the gas is typically between about 1% and about 10% oxygen with the remainder an inert gas. A preferred gas consists of about 1 to about 4% oxygen with the remainder nitrogen. The oxidation is accomplished either in a staging sequence or it is accomplished at a single temperature. The staging sequence during oxidation is normally required to avoid sintering of the catalyst metal. Staging refers to subjecting the catalyst to a series of gradually increasing oxidation temperatures for relatively short time periods rather than subjecting the catalyst to a single oxidation temperature for a longer period of time. When staging is employed, the oxidation temperature is raised to between about 75°C and about 125°C for between about one-third hour and about two-thirds hour, then at between about 175°C and about 225°C for between about one-third hour and two-thirds hour, and then at between about 375°C and about 450°C for between about 1 hour and about 1⅓ hours. When staging is not required, the catalyst is contacted with the oxygen-containing gas at a temperature of from about 350°C to about 450°C for between about 1 hour and about 3 hours, preferably between about 1½ hours and about 2½ hours.

The third step of the present regeneration procedure involves the reduction of the catalyst metal by contacting the oxidized catalyst with a hydrogen-containing gas at an elevated temperature. Pure hydrogen is used for this reduction, although for convenience, the same diluted hydrogen used for the first step hydrogen stripping is also useful for the reduction. Accordingly, the hydrogen content of the gas in the third step varies from 1 to 100%. It is preferred that the temperature of the catalyst during reduction be increased gradually from ambient temperature to a temperature of at least 150°C, although higher temperatures not to exceed 600°C are also used effectively. Preferably, the reduction temperature is from about 150°C to about 250°C, and the length of reduction is from about one-half hour to about 1 hour.

As is shown by Illustrative Embodiments I and II, use of the present invention in the Shokal process increases the catalyst life to over 50,000 grams of resin per gram of catalyst metal, as compared to a catalyst life of only about 15,000 grams of resin per gram of catalyst metal without regeneration. Other improvements for regenerated catalyst over fresh catalyst are also noted. One improvement is that the rate of hydrogenation with regenerated catalyst is higher than with fresh catalyst. In addition, in certain applications, the selectivity of regenerated catalyst is significantly higher than with fresh catalyst.

The invention is further illustrated by means of the following Illustrative Embodiments which illustrate the utility of the present invention when employed in the Shokal process, wherein substantially saturated epoxy compounds are prepared from the corresponding unsaturated epoxy compound. Note that the embodiments are for the purpose of illustration only and that the invention is not to be regarded as limited to any of the specific conditions or reactants recited therein.

The following Illustrative Embodiments and Comparative Example were conducted with identical rhodium catalyst compositions and aromatic epoxy resin compositions in a multi-batch process. In each run, the weight ratio of resin to rhodium metal was about 10,000:1, the solvent was methylene dichloride, the reactor pressure was 1,500 psig, and the reactor temperature was 80°C (unless otherwise noted). In each Illustrative Embodiment, the catalyst charged to the reactor in the first run was regenerated according to the invention and then reused in the subsequent runs within the embodiment.

The rhodium catalyst was prepared using a commercial grade of Harshaw alpha alumina powder as the carrier. To prepare the catalyst, rhodium trichloride trihydrate was first dissolved in a volume of water equivalent to the pore volume of the carrier. The carrier was then poured into the rhodium chloride solution and the container was shaken until the solution was absorbed into the carrier. The catalyst was then dried at 125°C for 6 hours. Next, the catalyst was reduced in a hydrogen atmosphere at 125°C for 8 hours. Subsequently, the catalyst was heated in boiling water for 30 minutes, followed by filtration and drying of the catalyst. The resultant catalyst had a rhodium content of about 1% by weight.

The aromatic epoxy resin employed in each embodiment and example was a low sulfur content diglycidyl ether of 2,2-bis(4-hydroxyphenyl)propane that had previously been treated with alumina according to the invention disclosed in a copending application by Bauer and De La Mare entitled Feed Purification Process, Ser. No. 521,990, filed Nov. 7, 1974, now abandoned.

The effectiveness of the catalyst was measured by 1) the average reaction rate, defined as the number of grams of resin that are hydrogenated per gram of rhodium metal per hour, 2) the epoxide retention value, defined as the amount of epoxy equivalent retained in 100 grams of the hydrogenated resin, and 3) the hydrogen chemisorption, defined as the amount of hydrogen absorbed by the fresh or regenerated catalyst on cooling from 500°C to ambient temperature based on the total amount of metal present and expressed as an atomic ratio. Hydrogen chemisorption is used as a relative measure of the active metal surface, whereas epoxide retention value is a measure of the selectivity of the catalyst.

ILLUSTRATIVE EMBODIMENT I

In this embodiment, run 1 comprised contacting the fresh catalyst with the resin and a methylene dichloride solvent at 80°C and 1,500 psig in an atmosphere consisting of 99.8% weight hydrogen and 0.2% weight oxygen. Under the above conditions, the conversion of the unsaturated resin was complete. The hydrogenated resin was removed and the quality of the resin determined. The catalyst was removed and subjected to regeneration according to the present invention.

The regeneration procedure comprised first contacting the spent catalyst with a nitrogen gas containing 6% hydrogen at 500°C for about one hour. Then the hydrogen-stripped catalyst was reoxidized by contacting the catalyst with a nitrogen gas containing 2% oxygen. The reoxidation procedure was accomplished in a series of steps — the temperature was raised to 100°C where it was held for one half hour, then the temperature was raised to 200°C where it was again held for one half hour, and then finally the temperature was raised to 400°C and held for 1 hour. After reoxidation, the catalyst was reduced by contacting the reoxidized catalyst with a nitrogen gas containing 5% hydrogen at 200°C for one half hour. The resultant regenerated catalyst was then employed in run number 2 where it was contacted with fresh resin and solvent at the same reaction conditions as in run 1.

Runs 2 and 3 were conducted identically to run 1 wherein after the hydrogenation reaction was completed, the catalyst was regenerated and then reused in the subsequent run. In run 4, the hydrogenation reaction took place at 90°C instead of 80°C, and the hydrogenation reaction was not carried to completion. The spent catalyst from run 4 was regenerated and reused in run 5. Run 5 was conducted under the same conditions as runs 1, 2 and 3 except that the hydrogen atmosphere contained no oxygen. The results are shown below in Table I.

Table I

| Run No. | Catalyst | Charge g Resin/g Rh | Product Yield g Hydrogenated Resin/g Rh |
|---|---|---|---|
| 1 | fresh | 10,000 | 10,000 |
| 2 | 1st Regeneration | 10,000 | 10,000 |
| 3 | 2nd Regeneration | 10,000 | 10,000 |
| 4 | 3rd Regeneration | 10,000 | 9,300 |
| 5 | 4th Regeneration | 10,000 | 10,000 |

| Accumulated Yield g Hydrogenated Resin/g Rh | Average Reaction Rate g Resin/g Rh/hr | Epoxide Retention Value % ave. | Hydrogen Chemisorption g atom $H_2$/g atom Rh |
|---|---|---|---|
| 10,000 | 700 | 87.2 | 0.38 |
| 20,000 | 800 | 95.2 | 0.26 |
| 30,000 | 800 | 94.9 | 0.20 |
| 39,300 | 1400 | 94.4 | not determined |
| 49,300 | 900 | 96.1 | 0.20 |

ILLUSTRATIVE EMBODIMENT II

Illustrative Embodiment II comprised a series of four runs. In each hydrogenation, the catalyst to resin ratio was 10,000:1, the temperature was 80°C and the pressure was maintained at 1,500 psig in a 100% hydrogen atmosphere. Fresh catalyst prepared as in Illustrative Embodiment I was employed in run 6. In runs 7 through 9, the spent catalyst from the previous run was regenerated by the method employed in Illustrative Embodiment I and reused in the run by contacting it with fresh resin and solvent. The results are shown below in Table II.

Table II

| Run No. | Catalyst | Charge g Resin/g Rh | Product Yield g Hydrogenated Resin/g Rh |
|---|---|---|---|
| 6 | fresh | 10,000 | 10,000 |
| 7 | 1st Regeneration | 10,000 | 10,000 |
| 8 | 2nd Regeneration | 10,000 | 10,000 |
| 9 | 3rd Regeneration | 10,000 | 10,000 |

| Accumulated Yield g Hydrogenated Resin/g Rh | Average Reaction Rate g Resin/g Rh/hr | Epoxide Retention Value % ave. | Hydrogen Chemisorption g atom $H_2$/g atom Rh |
|---|---|---|---|
| 10,000 | 800 | 88.1 | 0.44 |
| 20,000 | 1400 | 93.0 | not determined |
| 30,000 | 1300 | 92.8 | not determined |
| 40,000 | 1300 | 91.6 | 0.19 |

COMPARATIVE EXAMPLE I

In Comparative Example I, a catalyst that had been previously contacted with resin and methylene dichloride solvent at 80°C and 1,500 psig in a 100% hydrogen atmosphere was subjected to a conventional regeneration procedure for platinum-group catalysts. The spent catalyst was first dried in a 100% nitrogen gas at 125°C for 5 hours. Then the catalyst was oxidized by contacting the catalyst with a nitrogen gas containing 2% oxygen. The oxidation procedure was conducted at the same temperature and for the same periods as the reoxidation step in Illustrative Embodiment I. Subsequently, the catalyst was reduced by contacting the oxidized catalyst with a nitrogen gas containing 6% hydrogen at 200°C for one half hour.

The resulting catalyst obtained after conventional regeneration was totally inactive, and could not be effectively employed in any subsequent hydrogenation reactions.

We claim as our invention:

1. A process for the regeneration of a catalyst comprising between about 0.1 and 10.0 percent weight rhodium or ruthenium on an alpha alumina carrier, said catalyst having been employed in the hydrogenation of a diglycidyl ether of 2–2 bis(4-hydroxyphenyl)propane in the presence of a methylene dichloride solvent, wherein said catalyst becomes at least partially deactivated, such process comprising:
   a. contacting the deactivated catalyst with a hydrogen-containing gas at temperatures from about 400° to about 600°C for between about one-half hour and about 2 hours;
   b. contacting the hydrogen-treated catalyst with an oxygen-containing gas which contains between about 1 and about 10 percent volume oxygen in a staging sequence, said staging sequence consisting of contacting the catalyst with the oxygen-containing gas at between about 75°C and about 125°C for between about one-third hour and two-thirds hour, then at between about 175°C and 225°C for between one-third hour and two-thirds hour, and then at between about 375°C and 450°C for between about 1 hour and about 1⅓ hours; and
   c. contacting the oxidized catalyst with a hydrogen-containing gas at temperatures from about 150°C to about 600°C for between about one-half hour and about 1 hour.

2. The process according to claim 1 wherein said hydrogen-containing gas consists of between about 1 percent volume hydrogen and about 15 percent volume hydrogen with the remainder being nitrogen.

3. A process for the regeneration of a catalyst comprising between about 0.1 and 10.0 percent weight rhodium or ruthenium on an alpha alumina carrier, said catalyst having been employed in the hydrogenation of a diglycidyl ether of 2–2 bis(4-hydroxyphenyl)propane in the presence of a methylene dichloride solvent, wherein said catalyst becomes at least partially deactivated, such process comprising:
   a. contacting the deactivated catalyst with a hydrogen-containing gas at temperatures from about 400° to about 600°C for between about ½ hour and about 2 hours;
   b. contacting the hydrogen-treated catalyst with an oxygen-containing gas which contains between about 1 and about 10 percent volume oxygen at temperatures from about 350°C to about 450°C for between about 1 hour and about 3 hours; and
   c. contacting the oxidized catalyst with a hydrogen-containing gas at temperatures from about 150°C to about 600°C for between about one-half hour and about 1 hour.

4. The process according to claim 3 wherein said hydrogen-containing gas consists of between about 1 percent volume hydrogen and about 15 percent volume hydrogen with the remainder being nitrogen.

* * * * *